United States Patent
Yuhara et al.

(12)

(10) Patent No.: US 6,201,923 B1
(45) Date of Patent: Mar. 13, 2001

(54) OPTICAL FIBER GYROSCOPE

(75) Inventors: Toshiya Yuhara; Hirokazu Soekawa, both of Hitachi; Toshiyuki Tetsu, Kitaibaraki; Wataru Ohnuki, Takahagi; Shuhei Toyoda, Nagoya; Takenori Ichigi, Iwakura, all of (JP)

(73) Assignees: Hitachi Cable, Ltd., Tokyo (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/272,116

(22) Filed: Mar. 19, 1999

(30) Foreign Application Priority Data

Mar. 27, 1998 (JP) .................................. 10-082175

(51) Int. Cl.$^7$ ................ G02B 6/00; G01B 9/02
(52) U.S. Cl. .................. 385/137; 385/135; 356/350
(58) Field of Search .................. 385/135, 137, 385/147; 356/350; 242/445.1

(56) References Cited

U.S. PATENT DOCUMENTS 5,481,358 * 1/1996 Dyott et al. .................. 356/350

FOREIGN PATENT DOCUMENTS 0 383 231   8/1990 (EP) .
0 833 128   4/1998 (EP) .

OTHER PUBLICATIONS

H.C. LeFevre et al., "Integrated Optics: A Practical Solution For the Fiber–Optic Gyroscope", 1986 SPIE. pp. 562–573.
Patent Abstracts of Japan, vol. 1995, No. 07, 31 Aug. 1995 & JP 07 091969 A, 7 Apr. 1995 *abstract*.
Patent Abstracts of Japan, vol. 1996, No. 02, 29 Feb. 1996 & JP 07 280573 A, 27 Oct. 1995 *abstract*.
Patent Abstracts of Japan, vol. 014, No. 02, 29 Feb. 1996 & JP 02 005008 A, 9 Jan. 1990 *abstract*.

* cited by examiner

*Primary Examiner*—Cassandra Spyrou
*Assistant Examiner*—Jared Treas
(74) *Attorney, Agent, or Firm*—Burr & Brown

(57) ABSTRACT

Disclosed is an optical fiber gyroscope comprising a fiber coil composed of a lengthy optical fiber wound therearound in a predetermined number of turns, a coupler for optically coupling an optical fiber led from a light source and an optical fiber led to a photodetector, and an optical IC chip arranged between the fiber coil and the coupler and provided with a phase modulator and a polarizer mounted on an optical waveguide, the optical fiber gyroscope further comprising a fiber coil reel around which the lengthy optical fiber for constructing the fiber coil is wound in the predetermined number of turns, a coupler reel around which the optical fibers led in both directions from the coupler are wound in a predetermined number of turns, and a housing member including a plurality of compartments (reel-placing region, frame, frame) for accommodating at least the both reels, the light source, and the optical IC chip. Accordingly, the optical fiber gyroscope can be easily assembled in unit, and it is possible to effectively reduce the production cost of the optical fiber gyroscope.

1 Claim, 2 Drawing Sheets

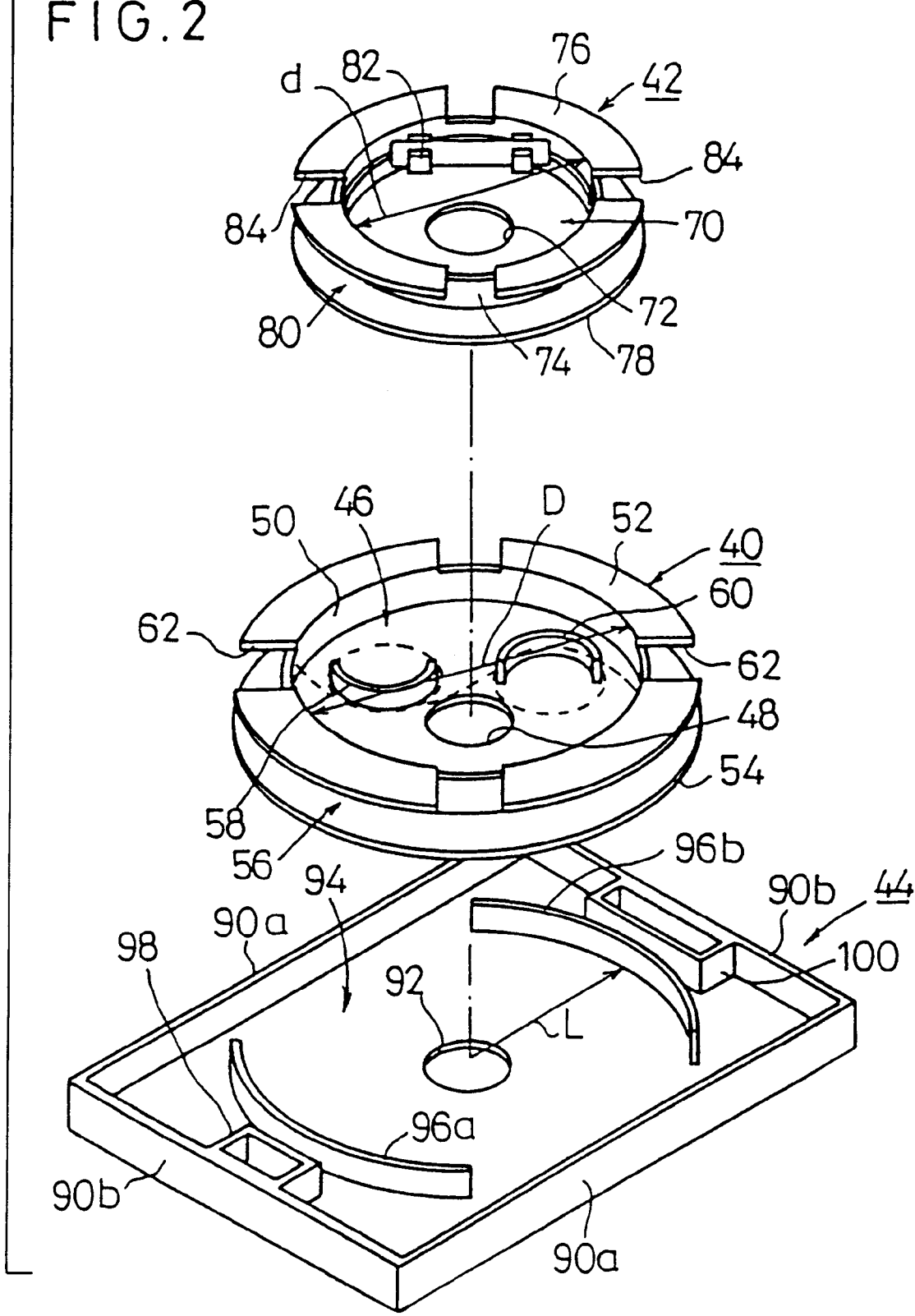

OPTICAL FIBER GYROSCOPE

BACKGROUND OF THE INVENTION

1. Field of the Invention

The present invention relates to an optical fiber gyroscope having a fiber coil which is formed, for example, by winding an optical fiber having a length of several tens meters to several hundreds meters in a predetermined number of turns.

2. Description of the Related Art

Recently, for example, a system has been suggested and practically used, in which a gyroscope is used for a navigation system of an automobile to detect the compass direction. Especially, an optical fiber gyroscope has been suggested, which is extremely advantageous in operability, convenient handling performance, and realization of a compact and light weight system, and which is also advantageous in improvement in durability because there is no mechanically movable component. Development is being rapidly advanced at present in order to practically use such an optical fiber gyroscope.

The system of the optical fiber gyroscope will now be briefly explained. The optical fiber gyroscope is a sensor for detecting the angular velocity based on the phase difference (Sagnac phase difference) between two light beams transmitted in both directions in a fiber coil obtained by winding an optical fiber having a length of several tens meters to several hundreds meters in a predetermined number of turns. The optical fiber gyroscope is classified into those belonging to the open loop system and those belonging to the closed loop system depending on the method for detecting the phase difference.

When it is intended to produce an optical fiber gyroscope which is excellent in, for example, compact and light weight properties and durability as described above, the process for assembling the optical fiber gyroscope especially comprises the steps of winding a lengthy optical fiber around a cylindrical object to produce a fiber coil, optically coupling an optical IC chip (optical waveguide) incorporated with a phase modulator to two ends of the optical fiber led from the fiber coil, optically coupling an optical fiber led from a light source to an optical fiber to be led to a photodetector by using a coupler, optically coupling an optical fiber led from the coupler to the optical IC chip, and packaging the optical IC chip. Therefore, a problem arises in that the operation for assembling the optical fiber gyroscope is extremely complicated.

Especially, when the optical waveguide element (optical IC chip) is connected to the fiber coil, residual lengths after connection are generated at both terminals of the fiber coil. However, in the case of the conventional gyroscope, the fiber coil wound around the reel is fixed to a casing by means of screws or the like. For this reason, a limitation arises concerning the fixed position in the direction of rotation of the reel with respect to the casing, and it is difficult to rewind all of the respective residual lengths of the fiber after connection around the reel in conformity with the respective winding directions. Therefore, it is necessary to separately provide a space for accommodating the residual lengths of the fiber after connection so that the residual lengths of the fiber after connection having been wound in a form of coil are accommodated in the provided space, resulting in an extremely troublesome operation.

Further, the optical fiber, which is led from the coupler, is extremely long as well. Therefore, a problem arises in that the long optical fiber is obstructive during the operation of optical coupling to the optical IC chip. Especially, in order to prevent the optical IC chip from any application of excessive load exerted by the long optical fiber when the optical IC chip is packaged, it is necessary to support the long optical fiber as a bundle, resulting in a problem that the operation efficiency is lowered.

As described above, the conventional optical fiber gyroscope involves the problem that an extremely long period of time is required for the assembling operation, and there is a limit to reduce the production cost.

Further, as described above, the product, which is obtained by connecting the optical IC or the like to the long optical fiber, has been not necessarily satisfactory to exhibit the stable performance as the optical fiber gyroscope, depending on the way of fixation to be used when the product is produced.

SUMMARY OF THE INVENTION

The present invention has been made taking such problems into consideration, an object of which is to provide an optical fiber gyroscope which can be easily assembled in unit, which makes it possible to effectively reduce the production cost of the optical fiber gyroscope, and which makes it possible to expect the stable performance to be exhibited.

According to the present invention, there is provided an optical fiber gyroscope comprising a fiber coil composed of a lengthy optical fiber wound therearound in a predetermined number of turns, a coupler for optically coupling an optical fiber led from a light source and an optical fiber led to a photodetector, and an optical waveguide element arranged between the fiber coil and the coupler and integrated with functions of at least a phase modulator and a polarizer, the optical fiber gyroscope further comprising a fiber coil reel around which the lengthy optical fiber for constructing the fiber coil is wound in the predetermined number of turns, a coupler reel around which the optical fibers led in both directions from the coupler are wound in a predetermined number of turns, and a housing member which is formed with a plurality of compartments for accommodating at least the both reels, the light source, and the optical waveguide element.

Accordingly, the fiber coil reel around which the lengthy optical fiber is wound in the predetermined number of turns and the coupler reel around which the optical fibers led in the both directions from the coupler are wound in the predetermined number of turns are accommodated in the compartments for accommodating the both reels formed in the housing member. The light source and the optical IC chip are accommodated in the corresponding compartments respectively. Thus, the optical fiber gyroscope is constructed.

In the present invention, the plurality of constitutive elements for constructing the optical fiber gyroscope are accommodated in one housing member in a compact manner. Therefore, it is possible to facilitate realization of the small size and the light weight of the optical fiber gyroscope and exhibit the stable performance.

Since the fiber coil reel is used, it is sufficient that the lengthy optical fiber is merely wound around the fiber coil reel in the predetermined number of times, when the fiber coil is produced. Therefore, the fiber coil can be produced extremely easily in a short period of time.

When the optical fiber gyroscope is constructed, it is necessary that the optical fiber led from the fiber coil and the optical fiber led from the coupler are optically coupled to the optical IC chip respectively, and the optical IC chip, for which the optical coupling has been completed, is packaged. However, the optical fiber is freely drawn from the respective reels, for example, in the operation for the optical coupling as described above. Therefore, the operation for the optical coupling is extremely easy, and the operation for packaging the optical IC chip to be performed thereafter is easy as well. Thus, the assembling operation can be completed within a short period of time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 shows an exploded perspective view illustrating constitutive components of the optical fiber gyroscope according to the embodiment of the present invention.

DESCRIPTION OF THE PREFERRED EMBODIMENTS

Figure 1:
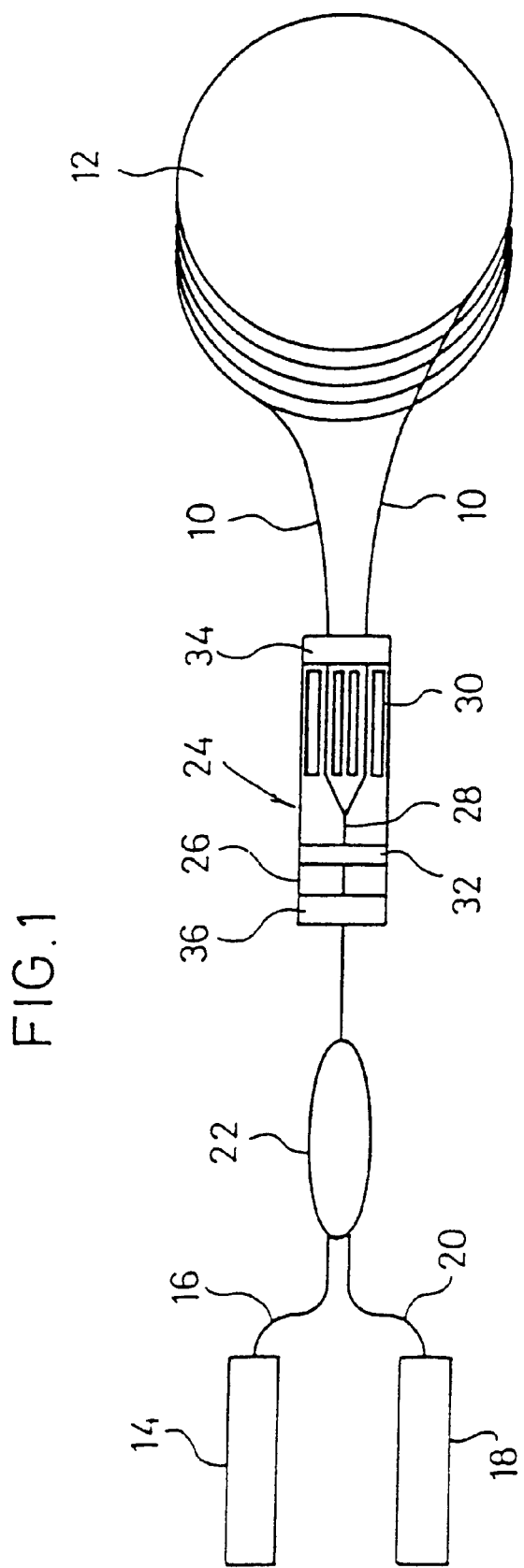
FIG. 1 schematically shows a structure of an optical fiber gyroscope according to an embodiment of the present invention.

An illustrative embodiment of the optical fiber gyroscope according to the present invention (hereinafter referred to as "optical fiber gyroscope according to the embodiment") will be explained below with reference to FIGS. 1 and 2.

At first, as shown in FIG. 1, the optical fiber gyroscope according to the embodiment of the present invention comprises a fiber coil 12 composed of a lengthy optical fiber 10 wound in a predetermined number of turns, a coupler 22 for optically coupling an optical fiber 16 led from a light source 14 to an optical fiber 20 led to a photodetector 18, and an optical waveguide 28 (for example, a Y-shaped optical waveguide) having a predetermined configuration formed on a substrate 26 arranged between the fiber coil 12 and the coupler 22. A phase modulator 30 and a polarizer 32 are mounted on the optical waveguide 28. For example, a super luminescent diode (SLD) can be used as the light source 14.

In this embodiment, two ends (a start end and a terminal end) of the optical fiber 10 led from the fiber coil 12 are secured to a first array 34 for regulating the joining direction with respect to an optical IC chip 24. One end (an end of the optical fiber 16 led from the light source 14) of the optical fiber 16 led from the coupler 22 is secured to a second array 36 for regulating the joining direction with respect to the optical IC chip 24. The respective ends of the respective optical fibers 10, 16 are optically coupled to the optical IC chip 24 via the first and second arrays 34, 36.

As shown in FIG. 2, the optical fiber gyroscope according to the present invention comprises a fiber coil reel 40 around which the lengthy optical fiber 10 for constructing the fiber coil 12 is wound, a coupler reel 42 which is used to hold the coupler 22 and around which the optical fibers 16, 20 led from the coupler 22 are wound, and a housing member 44 for accommodating the both reels 40, 42, the light source 14, and the optical IC chip 24.

The fiber coil reel 40 is made of plastic, and it is formed in an integrated manner. The fiber coil reel 40 is formed with a circular recess 46 which is open upwardly and which has a diameter D. A through-hole 48 is formed through a central bottom portion of the recess 46. The fiber coil reel 40 further comprises, in an integrated manner, flanges 52, 54 which are formed at the top and the bottom of a circumferential wall 50 of the recess 46 to extend outwardly respectively. This arrangement comparts a ring-shaped winding space 56 which are formed by the outer circumferential surface of the circumferential wall 50 and the mutually opposing surfaces of the two flanges 52, 54. Although not shown, the lengthy optical fiber 10 is wound around the outer circumferential surface of the circumferential wall 50 in the winding space 56. The fiber coil reel 40 is further provided, at the bottom of the recess 46, with a winding direction-reversing means for reversing the winding direction of the optical fiber 10. This means can be realized, for example, by providing two semicircular guide tabs 58, 60 provided at positions which are in point symmetry with each other.

The upper flange 52 is provided with a plurality of cutouts 62 for easily guiding, to the winding space 56, the optical fiber 10 having been reversed for the winding direction by the aid of at least the guide tabs 58, 60. In the embodiment shown in FIG. 2, the four cutouts 62 are formed at equal spacing distances respectively.

On the other hand, the coupler reel 42 is made of plastic, and it is formed in an integrated manner, in the same manner as the fiber coil reel 40. The coupler reel 42 is formed with a circular recess 70 which is open upwardly and which has a diameter d. A through-hole 72 is formed through a central bottom portion of the recess 70. The coupler reel 42 further comprises, in an integrated manner, flanges 76, 78 which are formed at the top and the bottom of a circumferential wall 74 of the recess 70 to extend outwardly respectively. This arrangement comparts a ring-shaped winding space 80 which are formed by the outer circumferential surface of the circumferential wall 74 and the mutually opposing surfaces of the two flanges 76, 78. Although not shown, the optical fibers 16, 20 led from the coupler 22 are wound around the outer circumferential surface of the circumferential wall 74 in the winding space 80.

The coupler reel 42 is further provided with holding tabs 82 for holding the coupler 22, the holding tabs 82 being formed at a bottom portion of the recess 70 in the vicinity of the circumferential wall 74 in an integrated manner or by means of adhesion. The holding tabs 82 can be used to hold the coupler 22. It is assumed that the coupler 22 has a cylindrical configuration.

The coupler reel 42 also has, for example, four cutouts 84 which are formed through the upper flange 76 at equal spacing distances respectively, in the same manner as in the fiber coil reel 40 as described above. Especially, the pair of cutouts 84, which are substantially formed on both sides of the coupler 22 held by the holding tabs 82, are used in order that the optical fibers 16, 20 led from the coupler 22 are guided to the winding space 80 via the cutouts 84. The other cutouts 84 are used, for example, to accommodate the end of the optical fiber 20 which is not used, via the cutout 84 in the recess 70.

The coupler reel 42 has its outer diameter which is set to be slightly smaller than the diameter D of the recess 46 of the fiber coil reel 40. Accordingly, the coupler reel 42 can be accommodated in the recess 46 of the fiber coil reel 40.

The housing member 44 is made of, for example, plastic in an integrated manner to have a box-shaped configuration with its rectangular plane, which is open upwardly and which is provided, on its four sides, with side walls rising upwardly (a pair of long side walls 90a and a pair of short side walls 90b). A through-hole 92 is formed through a substantially central bottom surface portion of the housing member 44. A pair of comparting tabs 96a, 96b, each of which is formed of plastic in an integrated manner, are provided at necessary positions for comparting a circular region (reel-placing region 94) which has its center of the through-hole 92 and which has its radius of a predetermined distance L from the through-hole 92.

A frame 98 for comparting a space to accommodate the light source 14 is formed in an integrated manner between one of the comparting tabs 96a and the short side wall 90b disposed in the vicinity thereof on the bottom surface of the housing member 44. A frame 100 for comparting a space to accommodate the optical IC chip 24 is formed in an integrated manner between the other comparting tab 96b and the short side wall 90b disposed in the vicinity thereof.

Next, a method for assembling the optical fiber gyroscope according to the embodiment of the present invention will be briefly explained.

At first, the lengthy optical fiber 10 is wound around the fiber coil reel 40. The coupler 22 is interposed and fixed by using the holding tabs 82 on the coupler reel 42. The optical fibers 16, 20 led from the coupler 22 are wound around the coupler reel 42.

Specifically, the lengthy optical fiber 10 is wound around the fiber coil reel 40 such that the optical fiber 10 is wound around the outer circumferential surface of the circumferential wall 50 while allowing it to enter the winding space 56 of the reel 40 in a state in which the start end 10a of the optical fiber 10 is gripped. In the final one turn, the optical fiber 10 is advanced along the winding direction-reversing means, i.e., the pair of guide tabs 58, 60 formed on the bottom of the recess to reverse the winding direction. Thus, the terminal end 10b of the optical fiber 10 is guided toward the side of the start end 10a. At this stage, the operation for winding the optical fiber 10 around the fiber coil reel 40 is completed.

On the other hand, the optical fiber 10 led from the coupler 22 fixed by the holding tabs 82 is wound around the coupler reel 42 as follows. That is, the two optical fibers (the fiber 16 to be connected to the optical IC chip 24 and the unused optical fiber 20), which are led, for example, from the right side of the coupler 22, are drawn to the winding space 80 through the right cutout 84. The drawn two optical fibers 16, 20 are wound, for example, clockwise around the circumferential wall 74. The end of the fiber 16 to be connected to the optical IC chip 24 is led to the outside of the coupler reel 42, and the end of the unused optical fiber 20 is accommodated in the recess 70.

Subsequently, for example, the two optical fibers (the optical fiber 16 to be connected to the light source 14 shown in FIG. 1 and the optical fiber 20 to be connected to the photodetector 18), which are led from the left side of the coupler 22, are drawn through the left cutout 84 to the winding space 80. The drawn two optical fibers 16, 20 are wound, for example, counterclockwise around the circumferential wall 74, and the respective ends are led to the outside of the reel 42. At this stage, the operation is completed for the optical fibers 16, 20 led from the coupler 20 to be wound around the coupler reel 42.

Subsequently, the first array 34 is glued to the start end 10a and the terminal end 10b of the optical fiber 10 led to the outside of the fiber coil reel 40. The second array 36 is glued to the end 16a of the optical fiber 16 to be connected to the optical IC chip 24, of the optical fibers 16, 20 led to the outside of the coupler reel 42.

Subsequently, the optical IC chip 24 is prepared, which comprises the polarizer 32 and the phase modulator 30 formed on the optical waveguide 28 shown in FIG. 1 as described above. The first and second arrays 34, 36, to which the optical fibers 10, 16 have been glued, are joined to the optical IC chip 24 respectively.

At the stage at which the first and second arrays 34, 36 have been completely jointed to the optical IC chip 24 as described above, the fiber coil reel 40, around which the optical fibers 16, 20 are around, is in turn placed on the reel-placing region 94 of the housing member 44. Further, the coupler reel 42 is accommodated in the recess 46 of the fiber coil reel 40.

A support shaft is inserted into the through-hole 92 of the housing member 44, and the support shaft is inserted into the through-hole 48 of the fiber coil reel 40. Thus, the reel 40 is rotatably placed on the reel-placing region 94 of the housing member 44. Subsequently, the support shaft is inserted into the through-hole 72 of the coupler reel 42. Thus, the coupler reel 42 is rotatably accommodated in the recess 46 of the fiber coil reel 40.

The optical IC chip 24, to which the optical fibers 10, 16 have been joined via the first and second arrays 34, 36, is then packaged.

After performing the foregoing steps, the substantial joining process is completed for the optical fiber 10 led from the fiber coil 12 and the optical fiber 16 led from the coupler 22, with respect to the optical IC chip 24.

After that, the support shaft, which is inserted into the through-holes 48, 72, 92, is withdrawn and removed. The optical IC chip 24 after being packaged is accommodated in the chip-accommodating frame 100 provided on the housing member 44, and the light source 14 is accommodated in the light source-accommodating frame 98 provided on the housing member 44 as well. At this stage, one unit of the optical fiber gyroscope is completed, in which the housing member 44 accommodates the plurality of constitutive components for constructing the optical fiber gyroscope (the fiber coil reel 40, the coupler reel 42, the optical IC chip 24, and the light source 14).

The unit as the optical fiber gyroscope is introduced into the next testing step to judge whether or not the unit is appropriate or defective, followed by shipping.

As described above, concerning the optical fiber gyroscope according to the embodiment of the present invention, the optical fiber gyroscope can be constructed as one unit by using the fiber coil reel 40, the coupler reel 42, and the housing member 44. Further, the plurality of constitutive components for constructing the optical fiber gyroscope are accommodated in one housing member 44. Thus, the optical fiber gyroscope is compact. Therefore, it is possible to facilitate realization of the compact size and the light weight of the optical fiber gyroscope and exhibit the stable performance.

The use of the fiber coil reel 40 makes it sufficient that the lengthy optical fiber 10 is merely wound around the fiber coil reel 40 in the predetermined number of turns, when the fiber coil 12 is produced. Therefore, the fiber coil 12 can be produced extremely easily in a short period of time.

When the optical fiber gyroscope is constructed, it is necessary that the optical fiber 10 led from the fiber coil 12 and the optical fiber 16 led from the coupler 22 are optically coupled to the optical IC chip 24 respectively, and the optical IC chip 24, which has been completed for the optical coupling, is packaged. In the operation for the optical coupling as described above, for example, the optical fibers are freely drawn from the respective reels 40, 42. Therefore, the operation for the optical coupling is extremely easy. Further, the operation for packaging the optical IC chip to be performed thereafter is also easy. Thus, the assembling operation can be completed for a short period of time.

It is a matter of course that the optical fiber gyroscope according to the present invention is not limited to the embodiment described above, which may be embodied in other various forms without deviating from the gist or essential characteristics of the present invention.

What is claimed is:

1. An optical fiber gyroscope comprising a fiber coil composed of a lengthy optical fiber wound therearound in a predetermined number of turns, a coupler for optically coupling an optical fiber led from a light source and an optical fiber led to a photodetector, and an optical waveguide element arranged between said fiber coil and said coupler and integrated with functions of at least a phase modulator and a polarizer, said optical fiber gyroscope further comprising:

a fiber coil reel around which said lengthy optical fiber for constructing said fiber coil is wound in said predetermined number of turns;

a coupler reel around which said optical fibers led in both directions from said coupler are wound in a predetermined number of turns; and a housing member which is formed with a plurality of compartments for accommodating at least said both reels, said light source, and said optical waveguide element.

* * * * *